(12) United States Patent
Sigal et al.

(10) Patent No.: US 7,436,980 B2
(45) Date of Patent: Oct. 14, 2008

(54) GRAPHICAL OBJECT MODELS FOR DETECTION AND TRACKING

(75) Inventors: Leonid Sigal, Providence, RI (US); Ying Zhu, Monmouth Junction, NJ (US); Dorin Comaniciu, Princeton Jct., NJ (US)

(73) Assignee: Siemens Corporate Research, Inc., Princeton, NJ (US)

( * ) Notice: Subject to any disclaimer, the term of this patent is extended or adjusted under 35 U.S.C. 154(b) by 691 days.

(21) Appl. No.: 11/135,210

(22) Filed: May 23, 2005

(65) Prior Publication Data

US 2005/0286738 A1    Dec. 29, 2005

Related U.S. Application Data

(60) Provisional application No. 60/574,799, filed on May 27, 2004.

(51) Int. Cl.
  *G06K 9/00*   (2006.01)
(52) U.S. Cl. ........................................................ 382/103
(58) Field of Classification Search ................ 382/103, 382/173
  See application file for complete search history.

(56) References Cited

U.S. PATENT DOCUMENTS 6,597,801 B1    7/2003    Cham et al.

7,200,266 B2 *  4/2007   Ozer et al. .................. 382/173

FOREIGN PATENT DOCUMENTS

EP         1 217 572 A2    6/2002

OTHER PUBLICATIONS

M. Isard. Pampas: Real-valued graphical models for computer vision, CVPR, vol. 1, pp. 613-620, 2003.
K. Okuma, A. Teleghani, N. de Freitas, J. Little and D. Lowe. A boosted particle filter: Multi-target detection and tracking, ECCV, 2004.
L. Sigal, S. Bhatia, S. Roth, M. Black and M. Isard. Tracking loose-limbed people, CVPR, 2004.
E. Sudderth, A. Ihler, W. Freeman and A. Willsky. Nonpararmetric belief propagation, MIT Laboratory for Information and Decision Systems Technical Report P-2551 (Oct. 15, 2002).
P. Viola and M. Jones. Rapid object detection using a boosted cascade of simple features, CVPR, 2001.
P. Viola, M. Jones and D. Snow. Detecting pedestrians using patterns of motion and appearance, ICCV, pp. 734-741, 2003.

(Continued)

*Primary Examiner*—Tom Y Lu
(74) *Attorney, Agent, or Firm*—Donald B. Paschburg; F. Chau & Associates, LLC

(57) ABSTRACT

A computer implemented method for object detection includes providing a spatio-temporal model for an object to be detected, providing a video including a plurality of images including the object, and measuring the object as a collection of components in each image. The method further includes determining a probability that the object is in each image, and detecting the object in any image upon comparing the probabilities for each image to a threshold for detecting the object.

16 Claims, 5 Drawing Sheets

OTHER PUBLICATIONS

Lan et al., "A unified spatio-temporal articulated model for tracking", Computer Vision and Pattern Recognition, 2004, Proceedings of the 2004 IEEE Computer Society Conference on Washington, DC, Jun. 27-Jul. 2, 2004, Piscataway, NJ, vol. 1, pp. 722-729.

Donohoe, "Combining Segmentation and Tracking for the Classification of Moving Objects in video Scenes", Conference Record, 22nd Asilomar Conference on Signals, Systems and Computers (Cat. No. 88CH2835-7), Maple Press San Jose, CA, USA, vol. 2, Oct. 31, 1988, pp. 533-538.

* cited by examiner

GRAPHICAL OBJECT MODELS FOR DETECTION AND TRACKING

This application claims priority to U.S. Provisional Application Ser. No. 60/574,799, filed on May 27, 2004, which is herein incorporated by reference in its entirety.

BACKGROUND OF THE INVENTION

1. Technical Field

The present invention relates to image processing, and more particularly to automatic detection and tracking of objects in images.

2. Discussion of Related Art

The problem of describing and recognizing categories of objects (e.g., faces, people, cars) is important to computer vision applications. It is common to represent objects as collections of features with distinctive appearance, spatial extent, and position. There is however a large variation in how many features are needed and how these features are detected and represented.

Therefore, a need exists for a system and method of detecting and tracking an object, implementing component detection and performing inference over space and time.

SUMMARY OF THE INVENTION

According to an embodiment of the present disclosure, a computer implemented method for object detection comprises providing a spatio-temporal model for an object to be detected, providing a video comprising a plurality of images including the object, and measuring the object as a collection of components in each image. The method further comprises determining a probability that the object is in each image, and detecting the object in any image upon comparing the probabilities for each image to a threshold for detecting the object.

Providing the spatio-temporal model for the object to be detected comprises providing detectors for each of the collection of components.

The spatio-temporal model is a graphical model comprising nodes corresponding to each of the collection of components and to the object.

Determining the probability that the object is in each image comprises detecting the object in a current image according to measurements of the object as a collection of components determined from a prior image and a later image relative to the current image.

Providing the spatio-temporal model for the object to be detected further comprises providing a temporal window defining a plurality of images in which measurements of components detected therein are passed to components detected in the current image.

Determining the probability that the object is in each image comprises determining the probability for a position and a size of the object in each image.

The threshold is provided for the object to be detected, wherein the threshold is determined empirically.

A joint probability distribution for the spatio-temporal model with N components is:

$$P(X_0^O, X_0^{C_0}, X_0^{C_1}, \ldots, X_0^{C_N}, \ldots, X_T^O, X_T^{C_0}, X_T^{C_1}, \ldots, X_T^{C_N}) =$$

$$\frac{1}{Z} \prod_{ij} \psi_{ij}(X_i^O, X_j^O)$$

-continued $$\prod_{ik} \psi_{ik}(X_i^O, X_i^{C_k}) \prod_{ikl} \psi_{kl}(X_i^{C_k}, X_i^{C_l}) \prod_i \phi_i(X_i^O) \prod_{ik} \phi_i(X_i^{C_k})$$

According to an embodiment of the present disclosure, a program storage device is provided readable by machine, tangibly embodying a program of instructions executable by the machine to perform method steps for object detection. The method steps comprising providing a spatio-temporal model for an object to be detected, providing a video comprising a plurality of images including the object, and measuring the object as a collection of components in each image. The method further comprises determining a probability that the object is in each image, and detecting the object in any image upon comparing the probabilities for each image to a threshold for detecting the object.

BRIEF DESCRIPTION OF THE DRAWINGS

Preferred embodiments of the present invention will be described below in more detail, with reference to the accompanying drawings.

DETAILED DESCRIPTION OF PREFERRED EMBODIMENTS

According to an embodiment of the present disclosure, a probabilistic framework for automatic component-based detection and tracking of objects in images and/or video combines object detection with tracking in a unified framework. Tracking makes use of object detection for initialization and re-initialization during transient failures for occlusions. Object detection considers the consistency of the detection over time. Modeling objects by an arrangement of image-base, and possibly overlapping, components facilitates detection of complex articulated objects as well as helps in handling partial object occlusions or local illumination changes.

Figure 2A:
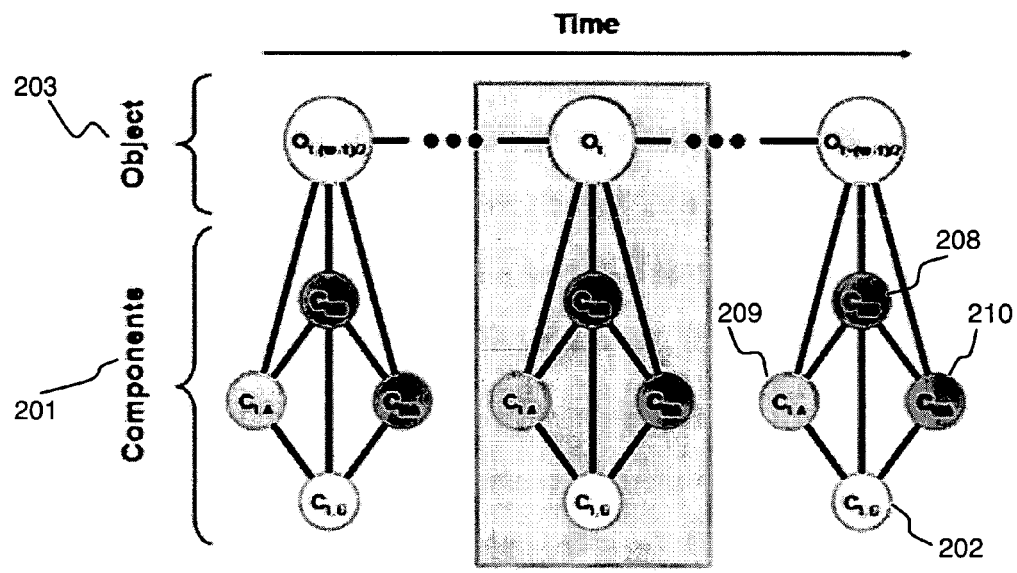
FIGS. 2A and 2B are graphic models for a pedestrian and vehicle, respectively, according to an embodiment of the present disclosure.
Figure 2B:
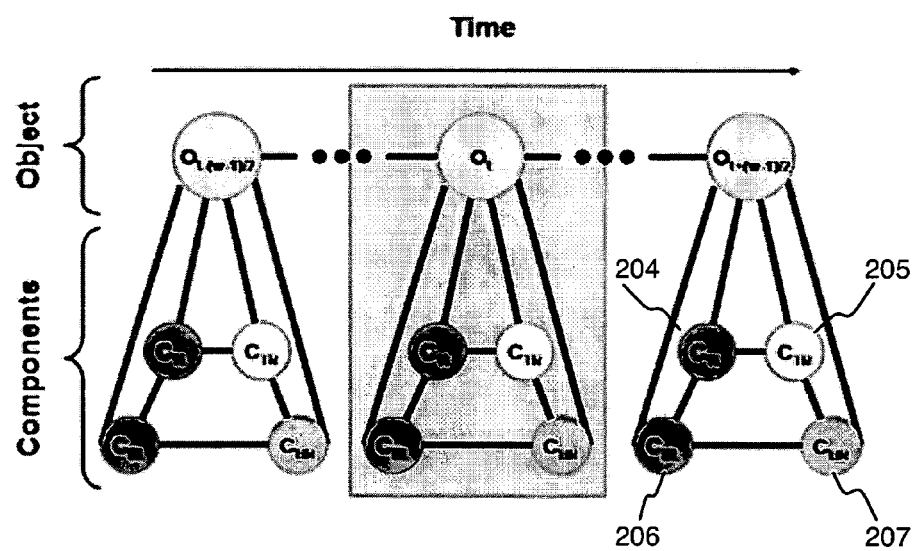

Referring to FIGS. 2A and 2B, object detection and tracking is formulated as an inference in a two-layer graphical model in which a coarse layer node represents the whole object and fine layer nodes represent multiple components of the object. Directed edges between nodes represent learned spatial and temporal probabilistic constraints. Each node in the graphical model corresponds to a position and scale of the component or the object as a whole in an image at a given time instant. Each node also has an associated Adaptive Boosting (Adaboost) detector that is used to define the local image likelihood and a proposal process. Typically the likelihoods and dependencies are not Gaussian. To infer the 2D position and scale at each node a non-parametric belief propagation (BP) is implemented that uses a variation of particle filtering and can be applied over a loopy graph.

It is to be understood that the present invention may be implemented in various forms of hardware, software, firmware, special purpose processors, or a combination thereof. In one embodiment, the present invention may be implemented in software as an application program tangibly embodied on a program storage device. The application program may be uploaded to, and executed by, a machine comprising any suitable architecture.

Figure 1:
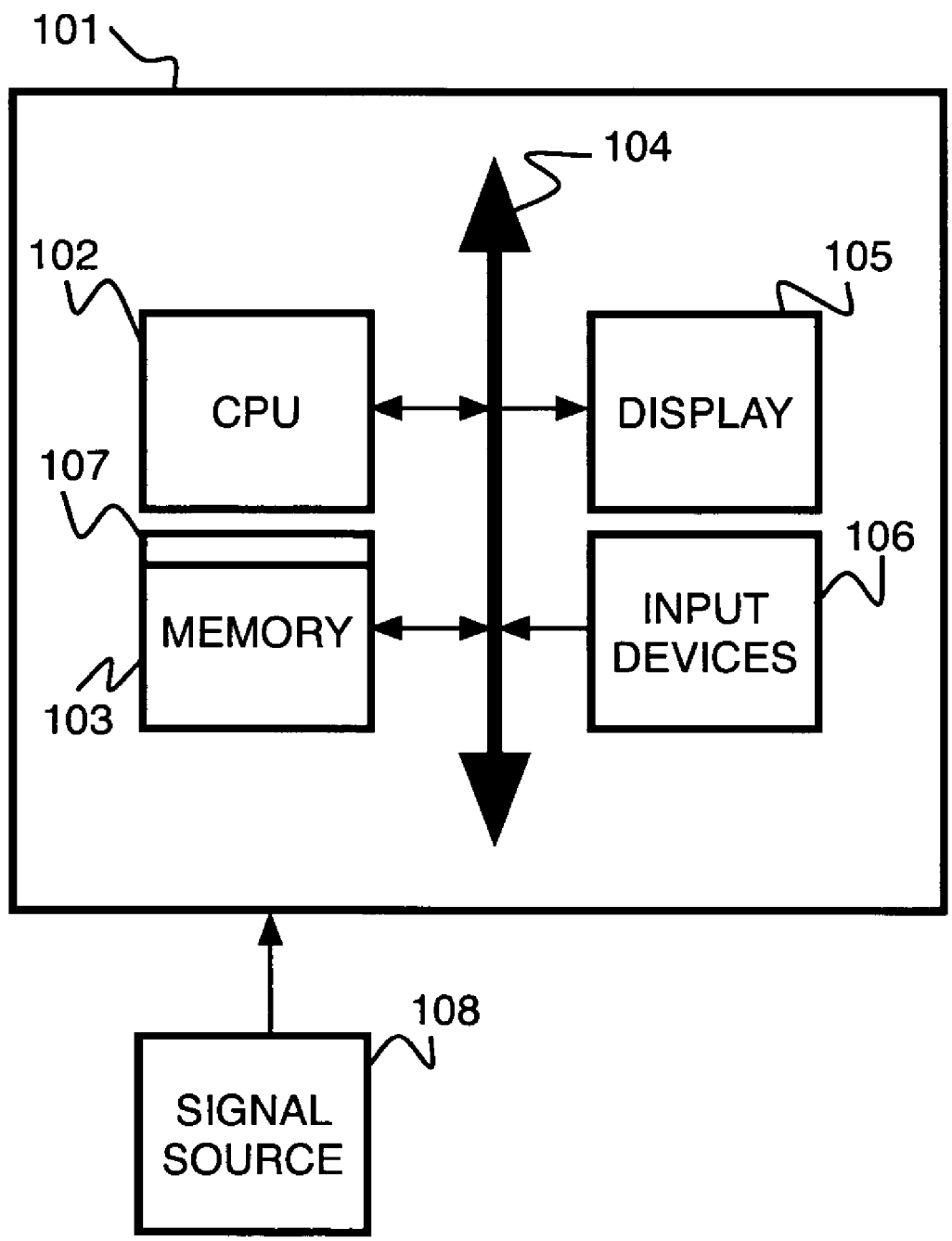
FIG. 1 is a system according to an embodiment of the present disclosure.

Referring to FIG. 1, according to an embodiment of the present disclosure, a computer system 101 for implementing an object detection and tracking method can comprise, inter alia, a central processing unit (CPU) 102, a memory 103 and an input/output (I/O) interface 104. The computer system 101 is generally coupled through the I/O interface 104 to a display 105 and various input devices 106 such as a mouse and keyboard. The support circuits can include circuits such as cache, power supplies, clock circuits, and a communications bus. The memory 103 can include random access memory (RAM), read only memory (ROM), disk drive, tape drive, etc., or a combination thereof. The present invention can be implemented as a routine 107 that is stored in memory 103 and executed by the CPU 102 to process the signal from the signal source 108. As such, the computer system 101 is a general purpose computer system that becomes a specific purpose computer system when executing the routine 107 of the present invention.

The computer platform 101 also includes an operating system and micro instruction code. The various processes and functions described herein may either be part of the micro instruction code or part of the application program (or a combination thereof), which is executed via the operating system. In addition, various other peripheral devices may be connected to the computer platform such as an additional data storage device and a printing device.

It is to be further understood that, because some of the constituent system components and method steps depicted in the accompanying figures may be implemented in software, the actual connections between the system components (or the process steps) may differ depending upon the manner in which the present invention is programmed. Given the teachings of the present invention provided herein, one of ordinary skill in the related art will be able to contemplate these and similar implementations or configurations of the present invention.

Graphical Object Models; An object, such as an automobile (see FIG. 2B), is modeled as a spatio-temporal directed graphical model. Each node in the graph represents either the object or a component of the object at time t. Nodes have an associated state vector $X^T=(x,y,s)$ defining the component's real-valued position and scale within an image (where $x,y,s,\in \Re$). The joint probability distribution for this spatio-temporal graphical object model with N components can be written as:

$$P(X_0^O, X_0^{C_0}, X_0^{C_1}, \ldots, X_0^{C_N}, \ldots, X_T^O, X_T^{C_0}, X_T^{C_1}, \ldots, X_T^{C_N}) =$$

$$\frac{1}{Z} \prod_{ij} \psi_{ij}(X_i^O, X_j^O)$$

$$\prod_{ik} \psi_{ik}(X_i^O, X_i^{C_k}) \prod_{ikl} \psi_{kl}(X_i^{C_k}, X_i^{C_l}) \prod_i \phi_i(X_i^O) \prod_{ik} \phi_i(X_i^{C_k})$$

where $X_t^O$ and $X_t^C$ is the state of the object, O, and object's n-th component, $C_n''$, at time t respectively (n $\in$(1,N) and t $\in$(1,T); $\psi_{ik}(X_i^O, X_j^O)$ is the temporal compatibility of object state between frames i and j; $\psi_{ik}(X_i^O, X_i^C)$ is the spatial compatibility of the object and it's components at frame i; $\psi_{ik}(X_i^C, X_i^C)$ is the spatial compatibility between object components at frame i and $\phi_i(X_i^O)$ and $\phi_i(X_i^C)$ denote the local evidence for the object and component states respectively.

According to an embodiment of the present disclosure, a system comprises the following modules: a graphical model modules, an inference module providing the ability to infer a state of each node in the graph, a local evidence distribution (or image likelihood) module, a proposal process module for some or all nodes in a graphical model, and a module comprising a set of spatial and/or temporal constraints corresponding to the edges in a graph.

Figure 3:
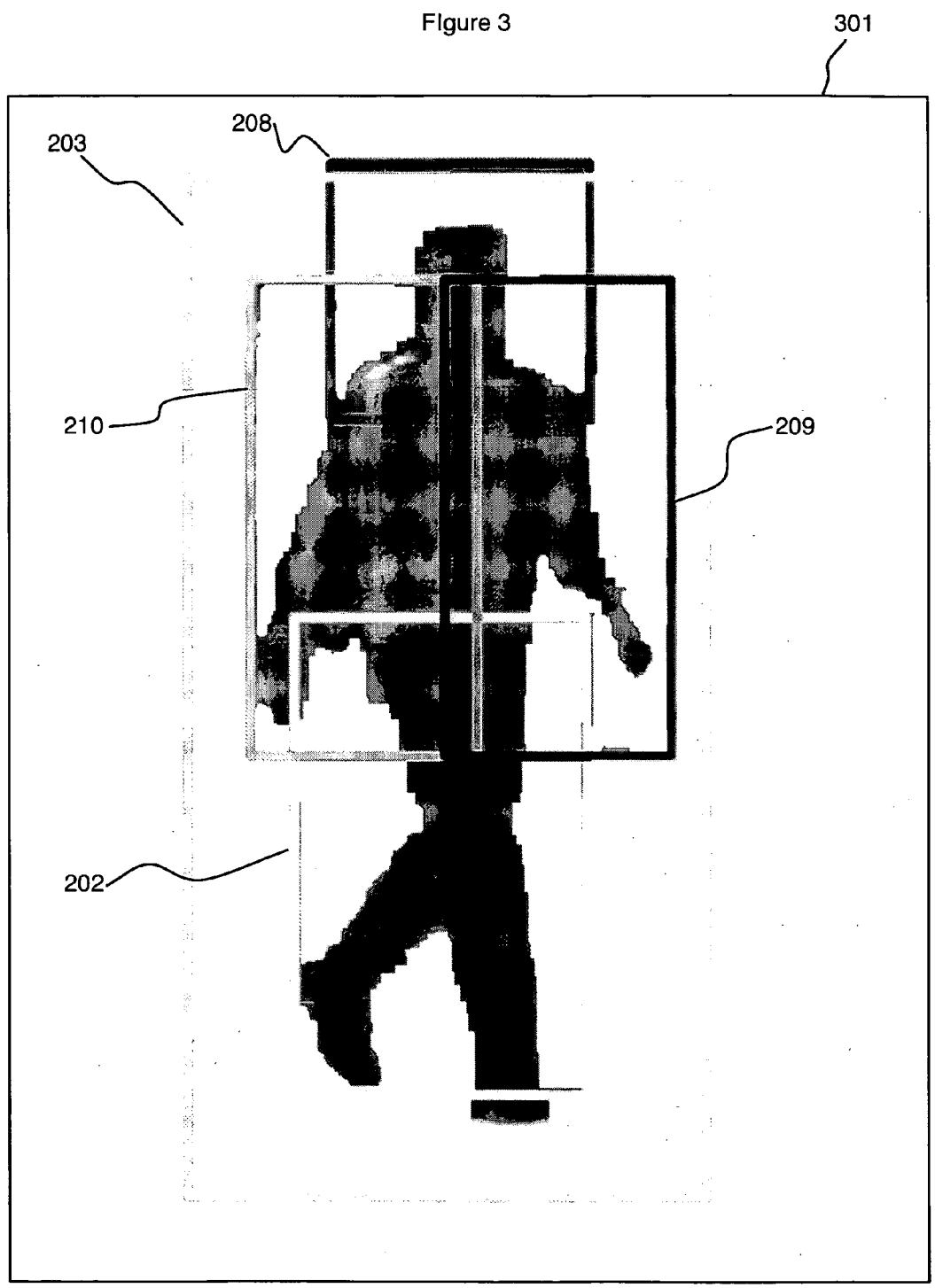
FIG. 3 is an illustration of a pedestrian and identified components of the pedestrian according to an embodiment of the present disclosure.

Building the Graphical Model; For a single frame, objects are represented using a two-layer spatial graphical model, for example as shown in FIGS. 2A and 2B. The fine, component, layer 201 includes a set of loosely connected parts, e.g., 202. The course, object, layer 203 corresponds to an entire appearance model of the object and is connected to all constituent components, e.g., 202. Examples of such models for pedestrian and vehicle detection are shown in the shaded regions of FIGS. 2A and 2B, respectively. In both cases objects are modeled using four overlapping image components. For the vehicle the components are: top-left (TL) 204, top-right (TR) 205, bottom-right (BR) 206 and bottom-left (BL) 207 corners; while for an image 301 of the pedestrian, they are: head (HD) 208, left arm (LA) 209, right arm (RA) 210 and legs (LG) 202 (see FIG. 3).

To integrate temporal constraints the spatial graphical models are extended over time to an arbitrary length temporal window. The resulting spatio-temporal graphical models are shown in FIGS. 2A and 2B. Having a two-layer graphical model allows the inference process to reason explicitly about the object as a whole, e.g., 203, and reduce the complexity of the graphical model by allowing the assumption of the conditional independence of components, e.g., 202 and 208-210, over time given the overall object appearance. Alternatively, a single object layer model can be built with bi-directional temporal constraints.

As can be seen in FIGS. 2A and 2B, an object at a current time is denoted as $o_t$ with an earlier model denoted as $o_{t-(w-1)/2}$ and a later model denoted as $o_{t+(w-1)/2}$.

Learning Spatial and Temporal Constraints; Each directed edge between components i and j has an associated potential function $\psi_{ij}(X_i, X_j)$ that encodes the compatibility between pairs of node states. The potential $\psi_{ij}(X_i, X_j)$ is modeled using a mixture of $M_{ij}$ Gaussians:

$$\psi_{ij}(X_i, X_j) = \lambda^0 \mathcal{N}(X_j; \mu_{ij}, \Lambda_{ij}) + (1 - \lambda^0)$$

$$\sum_{m=1}^{M_{ij}} \delta_{ijm} \mathcal{N}(X_j; F_{ijm}(X_i, X_j), G_{ijm}(X_i, X_j))$$

where $\lambda^0$ is a fixed outlier probability, $\mu_{ij}$ and $\Lambda_{ij}$ are the mean and covariance of the Gaussian outlier process, and $F_{ijm}(\cdot)$ and $G_{ijm}(\cdot)$ are functions that return the mean and covariance matrix respectively of the m-th Gaussian mixture component. $\delta_{ijm}$ is the relative weight of an individual component and $$\sum_{m=1}^{M_{ij}} \delta_{ijm} = 1.$$

For experiments described herein $M_{ij}=2$ mixture components were used.

Given a set of labeled images, where each component is associated with a single reference point, an iterative Expectation-Maximization (EM) method with K-means initialization is implemented to learn $F_{ijm}(\cdot)$ of the form:

$$F_{ijm}(X_i, X_j) = X_i + \left[ \frac{\mu_{ijm}^x}{\mu_{ijm}^s}, \frac{\mu_{ijm}^y}{\mu_{ijm}^s}, \mu_{ijm}^s \right]^T \quad (1)$$

where $\mu_{ijm}^x, \mu_{ijm}^y, \mu_{ijm}^s$ is the mean position and scale of component or object j relative to i. $G_{ijm}(\cdot)$ is assumed to be diagonal matrix, representing the variance in relative position and scale.

AdaBoost Image Likelihoods; A likelihood $\phi_i(X_i)$ models the probability of observing the image conditioned on the state $X_i$ of the node i. A likelihood model according to an embodiment of the present disclosure uses a boosted classifier and is robust to partial occlusions and the variability of image statistics across many different inputs.

Boosted detectors are trained for each component. For simplicity AdaBoost may be used without a cascade. Training with a cascade would likely improve the computational efficiency of the system. To reduce the number of false positives produced by the detectors, a bootstrapping method iteratively adds false positives that are collected by running the trained strong classifier over the set of background images (e.g., those not containing the desired object) and the detectors are retrained using the old positive and the new extended negative sets.

Given a set of labeled patterns the AdaBoost procedure learns a weighted combination of base weak classifiers, $$h(I) = \sum_{k=1}^{K} \alpha_k h_k(I),$$

where I is an image pattern, and $h_k(I)$ is the weak classifier chosen for the round k of boosting, and $\alpha_k$ is the corresponding weight. A weak classifier method is implemented: $\alpha_k(I) = p_k([(f_k(I))^{\beta}]^{1/\beta} < \theta_k)$ where $f_k(I)$ is a feature of the pattern I computed by convolving I with the delta function over the extent of a spatial template; $\theta_k$ is a threshold, $p_k$ is the polarity indicating the direction of inequality, and $\beta_k \in \{1,2\}$ allowing for a symmetric two sided pulse classification.

The output of the AdaBoost classifier is a confidence $h_k(I)$ that the given pattern I is of the desired class. An object is considered present if $$h(I) \geq \frac{1}{2} \sum_{k=1}^{K} \alpha_k.$$

This confidence is converted into a likelihood function by normalizing the $\alpha_k$'s, so that $h(I) \in [0,1]$, and exponentiating:

$$\phi_i(I|X_i) \propto \exp(h(I)/T) \quad (2)$$

where T is a temperature parameter that controls the smoothness of the likelihood function, with smaller values of T leading to a peakier distribution. Consequently the likelihood can be annealed by deriving a schedule with which T changes. An exponential annealing schedule $T=T_0 \upsilon^\kappa$ has been determined where $T_0$ is the initial temperature, $\upsilon$ is a fraction $\in (0,1)$, and $\kappa$ is the annealing iteration, to work well in practice.

Depending on an object one may or may not have a likelihood or a proposal process for the object layer nodes. For example, if the whole appearance of an object is too complicated to model as a whole (e.g., arbitrary size vehicles) and can only be modeled in terms of components, a uniform likelihood can be assumed over the object state space. In such cases the object layer nodes simply fuse the component information to produce estimates for the object state that are consistent over time.

Non-parametric BP; Inferring the state of the object and its components in a framework is defined as estimating belief in a graphical model. A form of non-parametric belief propagation PAMPAS (proposed by M. Isard in "PAMPAS: Real-valued graphical models for computer vision", in the Proceedings of IEEE International Conference on Computer Vision and Pattern Recognition, vol. I, pp. 421-428, 2004.) is implemented to deal with this task. The approach is a generalization of particle filtering, which allows inference over arbitrary graphs rather then a simple chain. In this generalization the message used in belief propagation is approximated with a kernel density, formed by propagating a particle set through a mixture of Gaussians density, and the conditional distribution used in standard particle filtering is replaced by product of incoming messages. Most of the computational complexity lies in sampling from a product of kernel densities required for message passing and belief estimation; we use efficient sequential multiscale Gibbs sampling and epsilon-exact-sampling to address this problem.

Individual messages may not constrain a node well, however the product over all incoming messages into the node tends to produce a very tight distribution in the state space. For example, any given component of a vehicle is incapable of estimating the height of the vehicle reliably, however once information from all components is intergraded in the object layer node, an estimate for the overall object size can be determined.

More formally a message $m_{ij}$ is written as $$m_{ij}(X_j) = \int \psi_{ij}(X_i, X_j) \phi_i(X_i) \prod_{k \notin \{A_i \setminus j\}} m_{ki}(X_i) d X_i \quad (3)$$

where $A_i$ is the set of neighbors of node i, $\{A_i \setminus j\}$ is the set of neighbors of node i except node j, and $\phi_i(X_i)$ is the local evidence (or likelihood) associated with the node i, and $\psi_{ij}(X_i, X_j)$ is the potential designating the compatibility between the states of node i and j. The details of how the message updates can be carried out by stratified sampling from belief and proposal function is illustrated in FIG. 4.

Figure 4:
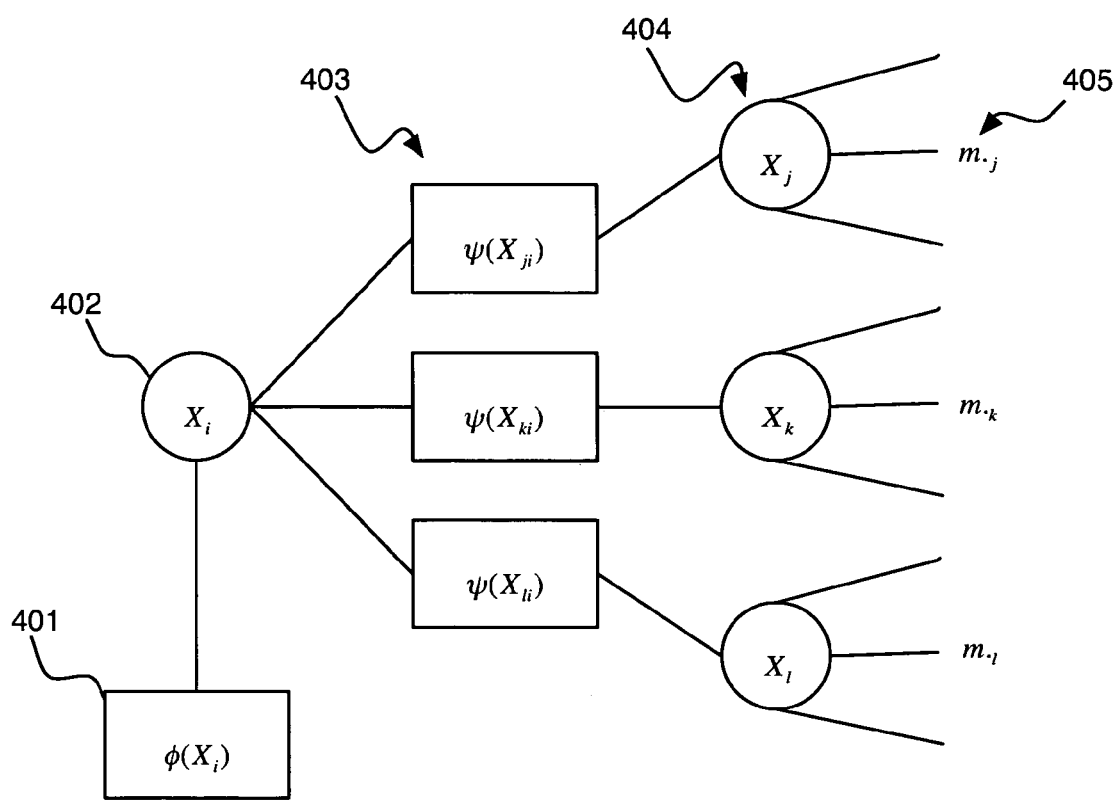
FIG. 4 is a flow chart of a method for message passing in graphic models according to an embodiment of the present disclosure.

Referring to FIG. 4, a method for passing messages between nodes of the graphical model includes determining a likelihood associated with node i 401, observing an image conditioned on the state of node i 402, determining a potential designating the compatibility between states of nodes i and i, nodes i and k and nodes i and l 403. Messages 405 are passed between nodes to propagate information about what states neighboring nodes would be 404.

While it is possible to perform inference over the spatio-temporal model defined for the entire image sequence, there are many applications for which this is not an option due to the lengthy off-line processing needed. A w-frame windowed smoothing algorithm is used where w is an odd integer $\geq 1$. There are two ways one can do windowed smoothing: in an object-detection centric way or a tracking centric way. In the former all nodes are re-initialized every time a window is shifted, hence the temporal integration is only applied in the window of size w. In the tracking centric way only the nodes associated with a new frame are initialized, which tends to enforce temporal consistency from before t−(w−1)/2. While the tracking-centric way tends to converge faster and produce more consistent results over time, it is also less sensitive to objects entering and leaving the scene. Note that with w=1, the algorithm resembles single frame component-based fusion.

Proposal Process; To reliably detect and track the object non-parametric BP makes use of the bottom-up proposal process, that constantly looks for and suggests alternative hypothesis for the state of the object and components. Proposal distribution is modeled using a weighted particle set. To form a proposal particle set for a component, a corresponding AdaBoost detector is run over an image at a number of scales to produce a set of detection results that score above the $$\frac{1}{2}\sum_{k=1}^{K}\alpha_k$$

threshold. While this set tends to be manageable for the entire appearance model, it is large for non-specific component detectors (e.g., a few thousand locations can easily be found). To reduce the dimensionality only the top P scoring detections are kept, where P is on the order of a 100 to 200. To achieve breadth of search sample particles from the proposal were imported using uniform distribution.

Figure 5:
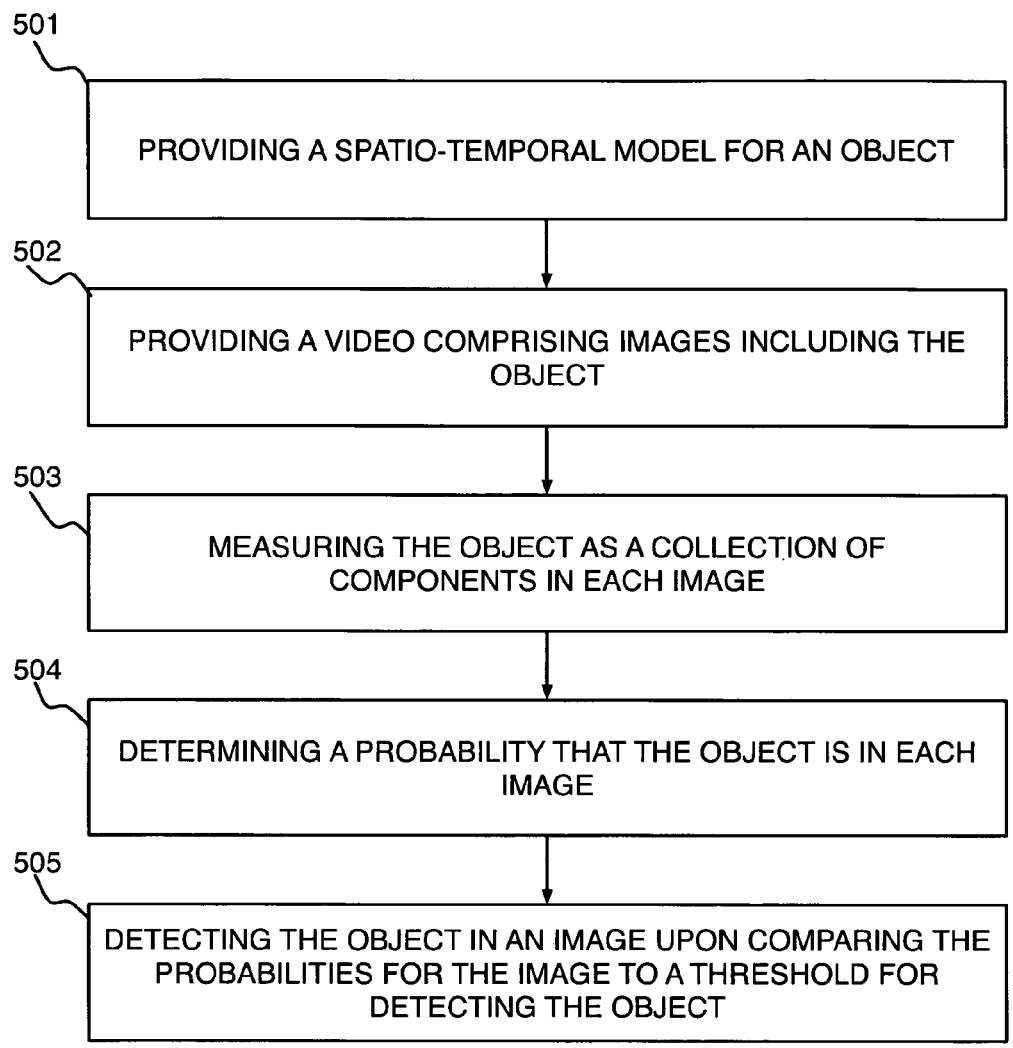
FIG. 5 is a flow chart of a method according to an embodiment of the present disclosure.

Referring to FIG. 5, a computer implemented method for object detection includes providing a spatio-temporal model, e.g., see FIGS. 2A and 2B, for an object 501, providing a video including a plurality of images including the object 502, and measuring the object as a collection of components in each image of the video 503. The method further includes determining a probability that the object is in each image 504 by using message passing between components represented as nodes of the spatio-temporal model, and detecting the object in any image upon comparing the probabilities for each image to a threshold for detecting the object 505.

Experiments; Tests were performed using a set of images collected with a single car-mounted grayscale camera. The result of vehicle detection and tracking over a sequence of 55 consecutive frames was evaluated. A 3-frame spatio-temporal object model was used and was shifted in a tracking centric way over time. BP was run with 30 particles for 10 iterations at every frame. For comparison a simple fusion scheme was implemented that averages the best detection result from each of the four components to produce an estimate for the vehicle position and scale independently at every frame. The performance of the simple fusion detection is poor suggesting that the noisy component detectors often do not have the global maximum at the correct position and scale. In contrast, the spatio-temporal object model consistently combines the evidence for accurate estimates throughout the sequence.

A 3-frame spatio-temporal object model was run at a single instance in time for two pedestrians in two different scenes. Similar to the vehicle detection BP was run with 30 particles for 10 iterations. For both experiments the temperature of the likelihood is set to $T_0=0.2$.

According to an embodiment of the present disclosure, an object detection and tracking framework exploits boosted classifiers and non-parametric belief propagation. The approach provides component-based detection and integrates temporal information over an arbitrary size temporal window. The performance of the framework is illustrated with two classes of objects: vehicles and pedestrians. In both cases position and scale of the objects and their components can be reliably inferred.

Having described embodiments for a system and method for a object detection and tracking, it is noted that modifications and variations can be made by persons skilled in the art in light of the above teachings. It is therefore to be understood that changes may be made in the particular embodiments of the invention disclosed which are within the scope and spirit of the invention as defined by the appended claims. Having thus described the invention with the details and particularity required by the patent laws, what is claimed and desired protected by Letters Patent is set forth in the appended claims.

What is claimed is:

1. A computer implemented method for object detection comprising:
   providing a spatio-temporal model for an object to be detected;
   providing a video comprising a plurality of images including the object;
   measuring the object as a collection of components in each image;
   determining a probability that the object is in each image; and
   detecting the object in any image upon comparing the probabilities for each image to a threshold for detecting the object.

2. The computer implemented method of claim 1, wherein providing the spatio-temporal model for the object to be detected comprises providing detectors for each of the collection of components.

3. The computer implemented method of claim 1, wherein the spatio-temporal model is a graphical model comprising nodes corresponding to each of the collection of components and to the object.

4. The computer implemented method of claim 1, wherein determining the probability that the object is in each image comprises detecting the object in a current image according to measurements of the object as a collection of components determined from a prior image and a later image relative to the current image.

5. The computer implemented method of claim 1, wherein providing the spatio-temporal model for the object to be detected further comprises providing a temporal window defining a plurality of images in which measurements of components detected therein are passed to components detected in the current image.

6. The computer implemented method of claim 1, wherein determining the probability that the object is in each image comprises determining the probability for a position and a size of the object in each image.

7. The computer implemented method of claim 1, wherein the threshold is provided for the object to be detected, wherein the threshold is determined empirically.

8. The computer implemented method of claim 1, wherein a joint probability distribution for the spatio-temporal model with N components is:

$$P(X_0^O, X_0^{C_0}, X_0^{C_1}, \ldots, X_0^{C_N}, \ldots, X_T^O, X_T^{C_0}, X_T^{C_1}, \ldots, X_T^{C_N}) =$$
$$\frac{1}{Z} \prod_{ij} \psi_{ij}(X_i^O, X_j^O)$$
$$\prod_{ik} \psi_{ik}(X_i^O, X_i^{C_k}) \prod_{ikl} \psi_{kl}(X_i^{C_k}, X_i^{C_l}) \prod_i \phi_i(X_i^O) \prod_{ik} \phi_i(X_i^{C_k}).$$

9. A computer readable medium embodying a computer program to perform method steps for object detection, the method steps comprising:
providing a spatio-temporal model for an object to be detected;
providing a video comprising a plurality of images including the object;
measuring the object as a collection of components in each image;
determining a probability that the object is in each image; and
detecting the object in any image upon comparing the probabilities for each image to a threshold for detecting the object.

10. The method of claim 9, wherein providing the spatio-temporal model for the object to be detected comprises providing detectors for each of the collection of components.

11. The method of claim 9, wherein the spatio-temporal model is a graphical model comprising nodes corresponding to each of the collection of components and to the object.

12. The method of claim 9, wherein determining the probability that the object is in each image comprises detecting the object in a current image according to measurements of the object as a collection of components determined from a prior image and a later image relative to the current image.

13. The method of claim 9, wherein providing the spatio-temporal model for the object to be detected further comprises providing a temporal window defining a plurality of images in which measurements of components detected therein are passed to components detected in the current image.

14. The method of claim 9, wherein determining the probability that the object is in each image comprises determining the probability for a position and a size of the object in each image.

15. The method of claim 9, wherein the threshold is provided for the object to be detected, wherein the threshold is determined empirically.

16. The method of claim 9, wherein a joint probability distribution for the spatio-temporal model with N components is:

$$P(X_0^O, X_0^{C_0}, X_0^{C_1}, \ldots, X_0^{C_N}, \ldots, X_T^O, X_T^{C_0}, X_T^{C_1}, \ldots, X_T^{C_N}) =$$
$$\frac{1}{Z} \prod_{ij} \psi_{ij}(X_i^O, X_j^O)$$
$$\prod_{ik} \psi_{ik}(X_i^O, X_i^{C_k}) \prod_{ikl} \psi_{kl}(X_i^{C_k}, X_i^{C_l}) \prod_i \phi_i(X_i^O) \prod_{ik} \phi_i(X_i^{C_k}).$$

* * * * *